United States Patent [19]

Legendre et al.

[11] Patent Number: 6,024,933
[45] Date of Patent: Feb. 15, 2000

[54] DIRECT OXIDATION METHOD FOR CONVERTING SULPHUR COMPOUNDS INTO SULPHUR WITH A COPPER CATALYST

[75] Inventors: Olivier Legendre, Herblay; Christophe Nedez, Salindres, both of France

[73] Assignee: Rhone-Poulenc Chimie, Courbevoie Cedex, France

[21] Appl. No.: 08/973,158

[22] PCT Filed: Mar. 28, 1997

[86] PCT No.: PCT/FR97/00565

§ 371 Date: Feb. 13, 1998

§ 102(e) Date: Feb. 13, 1998

[87] PCT Pub. No.: WO97/37750

PCT Pub. Date: Oct. 16, 1997

[30] Foreign Application Priority Data

Apr. 3, 1996 [FR] France .................................. 96 04164

[51] Int. Cl.$^7$ ........................... C01B 17/00; C01B 17/02; B01J 27/053; B01J 21/08

[52] U.S. Cl. ..................... 423/567.1; 423/573.1; 423/576; 502/217; 502/244; 502/254; 502/260

[58] Field of Search ..................................... 423/522, 531, 423/567.1, 576.2, 576.8, 574.1, 576, 573.1; 502/243, 244, 254, 260, 354, 217, 216

[56] References Cited

U.S. PATENT DOCUMENTS

| | | | |
|---|---|---|---|
| 4,310,497 | 1/1982 | Deschamps et al. ................... | 423/230 |
| 4,602,000 | 7/1986 | Dupin et al. ............................. | 502/335 |
| 4,605,546 | 8/1986 | Voirin ...................................... | 423/576 |
| 4,640,908 | 2/1987 | Dupin ...................................... | 502/243 |
| 4,814,159 | 3/1989 | Voirin .................................. | 423/574 R |
| 5,286,697 | 2/1994 | Van Den Brink et al. ............. | 502/257 |
| 5,352,422 | 10/1994 | Van Den Brink et al. ............. | 423/224 |
| 5,397,758 | 3/1995 | Bouruetaubertot et al. ............ | 502/303 |
| 5,512,258 | 4/1996 | Bouyanov et al. ..................... | 423/230 |
| 5,514,351 | 5/1996 | Buchanan et al. ...................... | 423/220 |
| 5,604,173 | 2/1997 | Bouyanov et al. ..................... | 502/354 |
| 5,607,657 | 3/1997 | Philippe et al. ....................... | 423/576.2 |
| 5,670,123 | 9/1997 | Mileo et al. ............................ | 423/220 |

*Primary Examiner*—Gary P. Straub
*Assistant Examiner*—Cam N. Nguyen
*Attorney, Agent, or Firm*—Burns, Doane, Swecker & Mathis, L.L.P.

[57] ABSTRACT

The invention relates to a process for the direct oxidation of sulphur compounds into elemental sulphur and/or into sulphates at a temperature below 200° C., in which a supported catalyst whose catalytically active phase comprises copper is used, the copper element being present in a content of at least 2% by weight relative to the catalyst and of at least 15 by weight relative to the sum of the elements of the catalytically active phase.

The use of a catalyst of this type ensures a high conversion of the $H_2S$ while at the same time minimizing the conversion into $SO_2$.

7 Claims, No Drawings

DIRECT OXIDATION METHOD FOR CONVERTING SULPHUR COMPOUNDS INTO SULPHUR WITH A COPPER CATALYST

The present invention relates to the use of catalysts for the treatment of gases, in particular industrial gaseous effluents, containing sulphur compounds, in order to catalytically convert these compounds into readily removable products.

The invention more particularly relates to the use of catalysts for the direct oxidation of hydrogen sulphide into sulphur and/or into sulphates.

The desulphurization of gases containing low concentrations of hydrogen sulphide has undergone considerable expansion. This treatment is applied in various fields:

for constraints associated with environmental protection, effluents originating from Claus units, also known as "tail gases", are increasingly subjected to an additional treatment, known as a tail gas treatment.

The residual compounds in these tail gases (sulphur vapour, sulphur dioxide, organosulphur compounds: $CS_2$, COS, etc.) may be eliminated by hydrogenation to hydrogen sulphide, after which this hydrogen sulphide is converted into elemental sulphur and/or sulphates.

It may also be envisaged at the outlet of the final Claus reactor to use a deliberate shift of the $H_2S/SO_2$ ratio and then to pass the effluent over a catalyst which allows the remaining $SO_2$ to be converted into sulphur via the Claus reaction ($2H_2S+SO_2 \rightarrow 3/x\ S_x+2H_2O$). Next, a final step of direct oxidation of the $H_2S$ into sulphur and/or sulphates completes the treatment.

deposits (natural gases, geothermal sources, etc.) containing gases naturally having a low concentration of hydrogen sulphide are also treated. In certain cases, a desulphurization based on a Claus process proves to be difficult, if not impossible, and a process of direct conversion of the hydrogen sulphide into sulphur and/or sulphates is preferable.

The present invention relates to processes using the final reaction for the conversion of hydrogen sulphide into elemental sulphur and/or into sulphates in the presence of oxygen, and in particular at a temperature below the dew point of sulphur, i.e. below 200° C. The advantage of working at such a temperature is, on the one hand, to be able to recover the sulphur in liquid or solid form in the porosity of the catalyst, and, on the other hand, to shift the thermodynamic equilibrium in the direction favourable to the reaction for the formation of sulphur.

However, the fault with this type of process is that, concomitantly with the formation of the elemental sulphur, sulphur dioxide is often produced in parallel and is not retained on the catalyst, leading to a loss of yield for the purification of the gases.

Thus, the catalysts of the prior art do not make it possible to ensure the best possible conversion of the $H_2S$ with maximum selectivities with respect to sulphur and/or sulphates and a minimum selectivity with respect to $SO_2$.

One aim of the present invention is to provide a catalyst which makes it possible, during the reaction for the direct oxidation of sulphur compounds at low temperature (T<200° C.), to increase the conversion of $H_2S$ while at the same time minimizing the conversion into $SO_2$.

In particular, one aim of the present invention is to provide a catalyst which makes it possible to obtain, during the reaction defined above, a degree of conversion of $H_2S$ close to 100% and a yield of $SO_2$ close to 0%.

With this aim, the invention relates to a process for the direct oxidation of sulphur compounds into elemental sulphur and/or into sulphates at a temperature below 200° C., in which a supported catalyst whose catalytically active phase comprises copper is used, the copper element being present in a content of at least 2% by weight relative to the catalyst and of at least 15% by weight relative to the sum of the active elements of the catalytically active phase.

Other details and advantages of the invention will emerge more clearly on reading the description which follows.

The invention thus relates to a process for the direct oxidation of sulphur compounds into elemental sulphur and/or into sulphates at a temperature below 200° C., in which a supported catalyst whose catalytically active phase comprises copper is used, the copper element being present in a content of at least 2% by weight relative to the catalyst and of at least 15% by weight relative to the sum of the active elements of the catalytically active phase.

In the process according to the invention, the catalyst is a supported catalyst, that is to say that it is composed of a support and of a catalytically active phase deposited on this support. The catalytically active phase of this catalyst is characterized in that it comprises copper. The copper may be in the oxide form and/or in the form of a copper salt, it being possible for the latter to be chosen, for example, from copper nitrate, sulphate or chloride.

In addition, the catalyst should comprise copper in a certain amount in order to satisfy the aims set in the present invention. Thus, the copper element should be present in a content of at least 2% by weight relative to the catalyst, preferably of at least 4%. The copper element should also be present in a content of at least 15% by weight relative to the sum of the active elements of the catalytically active phase, preferably of at least 25%. Particularly advantageous results were obtained for a copper content of at least 30%, and especially of at least 35%, by weight relative to the sum of the active elements of the catalytically active phase.

In general, the content of catalytically active elements (copper and elements other than copper) is not more than 80% by weight relative to the catalyst.

According to a first variant of the invention, the process according to the invention uses a catalyst in which the copper represents 100% by weight of the sum of the active elements of the catalytically active phase. Thus, the catalytically active phase of the catalyst comprises only copper compounds as catalytically active agents.

However, impurities or elements other than copper in amounts which are sufficiently negligible to have no catalytic effect may be present.

In this first variant, particularly good results are obtained for a copper content of at least 6% by weight relative to the support.

According to a second variant of the invention, the catalytically active phase comprises copper and at least one other active element chosen from iron, molybdenum, titanium, nickel, cobalt, tin, germanium, gallium, ruthenium, antimony, niobium, manganese, vanadium, magnesium, calcium and chromium. Preferably, it is one of the following elements: iron, nickel, cobalt, calcium, molybdenum, vanadium and ruthenium.

As with the copper, these elements may be present in oxide form or in the form of salts such as sulphates, nitrates or chlorides.

According to the preferred mode of this second variant, the catalytically active phase is composed of copper and cobalt, the cobalt content being not more than 5% by weight relative to the catalyst and the copper content not more than 6% by weight relative to the catalyst.

The support for the catalyst is generally based on titanium dioxide, zirconia, silica, alumina-silica or alumina.

Usually, the catalysts are in the form of beads; however, any form may be envisaged, in particular extrudates of solid or hollow shape with a cylindrical or multilobed profile, millings, pellets, granules and monoliths, most particularly in honeycomb form.

The catalysts are preferably in the form of beads between 1 and 10 mm in diameter or in the form of extrudates with a cross-section of between 0.7 and 5 mm.

The support may also comprise additives to facilitate shaping and additives to improve the final mechanical properties.

In the preparation of the catalyst of the invention, use may be made of the additives conventionally used in shaping techniques. These additives impart Theological properties suitable for shaping to the paste obtained by kneading. By way of example, mention may be made in particular of: cellulose, carboxymethylcellulose, carboxyethylcellulose, tall oil, xanthan gums, surfactants, flocculants such as polyacrylamides, carbon black, starches, stearic acid, polyvinyl alcohol, biopolymers, glucose or polyethylene glycols. The amount of these additives may range between 0 and 15% by weight relative to the weight of the catalyst.

In addition, it is possible to use complementary constituents which are capable of improving the mechanical qualities of the formulations. These constituents may be chosen from clays, silicates, alkaline-earth metal sulphates, ceramic fibres and asbestos. These constituents may be used in weight amounts relative to the support which may range up to 99.5% by weight, particularly up to 60%, preferably up to 30%.

The supports may be obtained by shaping the base material of the support, which is in powder form, using, for example, a pelleting machine, a rotating granulator or an extruder. The supports obtained are then generally dried and calcined.

During shaping, the base material may be mixed with additives.

When the support is based on alumina, it is preferable to use an alumina having a specific surface (SS) of at least 20 m$^2$/g, or even of at least 40 m$^2$/g. This specific surface is a surface measured by the BET method.

The expression surface measured by the BET method is understood to refer to the specific surface determined by adsorption of nitrogen in accordance with ASTM standard D 3663-78 established from the Brunauer—Emmett—Teller method described in the periodical, The Journal of the American Chemical Society, 60, 309 (1938).

It is also desirable for the alumina of the catalyst support to have a total pore volume (TPV) of at least 0.3 cm$^3$/g, preferably of at least 0.4 cm$^3$/g. This TPV is measured in the following way: the value of the grain relative density and of the absolute density are determined: the grain relative density (Dg) and absolute density (Da) are measured by the picnometry method with mercury and with helium respectively; the TPV is given by the formula:

$$\frac{1}{Dg} - \frac{1}{Da}.$$

These catalyst supports may be obtained by any technique known to those skilled in the art.

As regards the alumina, the alumina powder used as starting material for the preparation of the support may be obtained by standard processes such as the process by precipitation or gel, and the process by rapid dehydration of an alumina hydroxide such as the hydrate from Bayer (hydrargillite). The latter alumina is the preferred one of the invention.

If alumina beads are used, they may be obtained from a shaping operation by coagulation as drops. Beads of this type may be prepared, for example, according to the teaching of patents EP-A-0,015,801 or EP-A-0,097,539. The porosity may be controlled in particular according to the process described in patent EP-A-0,097,539 by coagulation as drops of an aqueous dispersion or suspension of alumina or of a solution of a basic aluminium salt in the form of an emulsion consisting of an organic phase, an aqueous phase and a surfactant or an emulsifying agent. The said organic phase may in particular be a hydrocarbon; the surfactant or emulsifying agent is, for example, Galoryl EM 10®.

The bead-shaped supports may also be obtained by agglomeration of an alumina powder. The agglomeration in the shape of beads is carried out directly on the alumina powder by rotating technology. The term rotating technology is understood to refer to any apparatus in which the agglomeration is carried out by bringing the product to be granulated into contact and into rotation with itself. Apparatus of this type which may be mentioned are the rotating granulator and the rotating drum. This type of process makes it possible to obtain beads of controlled pore sizes and pore distributions, these sizes and these distributions generally being created during the agglomeration step. The volumes of the pores of given diameter may also be controlled during this agglomeration step by suitable adjustment of the rate of introduction of the alumina powder and optionally of water or of the speed of rotation of the apparatus or during the introduction of a shaping primer.

If the supports are alumina extrudates, they may be obtained by kneading and then extrusion of an alumina-based material, it being possible for the said material to be obtained by rapid dehydration of hydrargillite or by precipitation of an alumina gel. The porosity of the extrudates may be controlled by the operating conditions for kneading this alumina before extrusion. The alumina may also be mixed with pore-forming agents during the kneading. By way of example, the extrudates may be prepared by the preparation process described in patent U.S. Pat. No. 3,856,708.

If the alumina supports are millings, they may be obtained by milling any type of alumina-based material such as, for example, beads obtained by processes of any type (coagulation as drops, rotating drum or granulator) or extrudates. The porosity of these millings is controlled by the choice of the alumina-based material which is milled to obtain them.

Irrespective of the form of the alumina supports, the porosity may be created by various means, such as the choice of the particle size of the alumina powder or the mixing of several alumina powders of different particle sizes. Another method consists in mixing the alumina powder, before or during the agglomeration or extrusion steps, with a compound, known as a pore-forming agent, which disappears totally on heating and thus creates porosity in the supports.

As pore-forming compounds used, mention may be made, by way of example, of wood flour, wood charcoal, sulphur, tars, plastics or emulsions of plastics such as polyvinyl chloride, polyvinyl alcohols, naphthalene or the like. The amount of pore-forming compounds added is not critical and is determined by the desired pore volume.

After they have been shaped, the alumina supports obtained may be subjected to various operations intended to improve their mechanical strength, such as maturation by keeping them in an atmosphere with a controlled level of humidity, followed by calcination and then impregnation of the supports with a solution of one or more acids and a hydrothermal treatment in a confined atmosphere.

Lastly, after these various treatments, the supports are dried and calcined.

When the catalyst support is based on titanium dioxide, it may be obtained by any method of preparation known to those skilled in the art. One method is that described in the documents EP-A-038,741 and EP-A-060,741, which consists in extruding a mixture comprising:

from 1 to 40% by weight of water, from 0 to 15% by weight of shaping additives as defined above, from 45 to 99% by weight of a poorly crystallized and/or amorphous titanium dioxide powder having a loss on ignition of between 1 and 50%, and then in shaping this mixture and in drying and calcining it.

When the catalyst support is based on zirconium, it can be obtained by any preparation method known to those skilled in the art. Mention may be made especially, in this case, of a preparation by precipitation by adding a basic compound, for example aqueous ammonia, to a solution of an acidic zirconium precursor, for example a zirconium nitrate, chloride or sulphate. This preparation can moreover be carried out by reversing the order of the reactants.

Other ways of preparing zirconium oxide which may be mentioned are calcination processes, in particular direct calcination of a precursor of the abovementioned type, for example in a flame. Lastly, mention may be made of production processes starting with a sol, in particular preparation via a sol obtained from the hot hydrolysis of a solution of a precursor of the abovementioned type.

The catalytically active phase may be deposited on or in the support by any method known to those skilled in the art. It may be deposited, for example, by impregnation of the pre-prepared support with the catalytically active elements or precursors of these elements, or by mixing the catalytically active elements or the precursors with the support material during shaping of the latter. In the case of alumina, the catalytic phase may also be deposited in the support by co-precipitation of the alumina and of the catalytically active elements or their precursors.

In the case of a deposition by impregnation, this deposition is carried out in a known manner by placing the support in contact with a solution, a sol or a gel comprising at least one catalytically active element in the form of an oxide or of a salt or of one of their precursors.

The operation is generally carried out by soaking the support in a predetermined volume of solution of at least one precursor of a catalytically active element. The expression solution of a precursor of a catalytically active element is understood to refer to a solution of a salt or compound of the element or of at least one of the elements constituting the catalytically active phase, these salts and compounds being thermally decomposable. In general, copper nitrate is used as copper precursor.

The salt concentration of the solution is chosen as a function of the amount of active phase to be deposited on the support.

The impregnation surface of the catalytically active phase is determined by the volume of solution adsorbed. Thus, the volume of catalytically active phase adsorbed is equal to the total pore volume of the support to be impregnated. It is also possible to impregnate the support by soaking it in the solution of catalytically active element precursor and to remove the excess solution by draining.

According to a preferred mode, the catalytically active phase is deposited by dry impregnation.

The support may then be subjected to a drying operation and optionally to calcination. For example, the catalyst may be calcined at a temperature between 300 and 1000° C., preferably between 300 and 800° C.

It is also possible to repeat these operations with the same support, after having dried and calcined it, and to deposit several elements successively or copper several times on the support. These successive depositions can be made on given surfaces which can vary for each deposition. Thus, according to a preferred mode of preparing the catalysts used in the present invention, the copper element of the catalytically active phase is deposited on the support by impregnation, followed by drying and calcination, and these same operations are repeated at least once.

When the catalytically active phase is deposited during the shaping operation, the catalytically active elements or their precursors are mixed with the starting material of the support before it is shaped.

The invention also relates to the use of the catalyst described above for the direct oxidation of sulphur compounds into elemental sulphur. This use makes it possible in particular to treat effluents containing amounts of $H_2S$ of less than 2% by volume.

The contact times of the reaction medium with the catalyst may range from 0.5 to 20 sec, preferably from 1 to 10 sec, or even from 2 to 8 sec, these values being given under standard pressure and temperature is conditions; preferably, the direct oxidation is carried out to a contact time of at least 3 sec.

In general, the process according to the invention is carried out continuously: in a first stage, the sulphur compounds are oxidized to sulphur and/or sulphates using the catalyst, and, in a second stage, the catalyst is regenerated in order to be reused.

Thus, the gas to be treated, to which oxygen has been added, is first passed over the catalyst at a temperature of between 50 and 200° C., preferably between 100 and 170° C.

Then, in a second stage, the catalyst charged with sulphur is flushed with an oxygen-free gas at a temperature of between 200 and 500° C. in such a way as to regenerate it.

This process is particularly suitable for application in the treatment of gaseous mixtures with a low content of $H_2S$, since the reaction is very exothermic and a considerable raising of the temperature would have the consequence, on the one hand, of vaporizing at least some of the sulphur produced by the reaction, and, on the other hand, that the oxidation of the $H_2S$ would be less selective: larger amounts of $SO_2$ would be formed.

The examples which follow illustrate the invention without, however, limiting the scope thereof.

EXAMPLES

Preparation of catalysts according to the invention

The characteristics of the supports used are collated in Table 1.

TABLE 1

| Type | Nature | Specific surface ($m^2/g$) | Total pore volume ($cm^3/g$) | Diameter or cross-section (mm) |
|---|---|---|---|---|
| Beads 1 | Alumina | 192 | 0.71 | 2–3.2 |
| Beads 2 | Alumina | 315 | 0.5 | 2–3.2 |

TABLE 1-continued

| TYpe | Nature | Specific surface ($m^2/g$) | Total pore volume ($cm^3/g$) | Diameter or cross-section (mm) |
|---|---|---|---|---|
| Beads 3 | Alumina | 68 | 0.68 | 2–3.2 |
| Beads 4 | Alumina | 131 | 1.04 | 2–3.2 |
| Extrudates 1 | Alumina | 229 | 0.65 | 1.2 |
| Extrudates 2 | Titanium dioxide | 124 | 0.36 | 3.5 |

1. Deposition of the copper element:

Catalysts are prepared having different catalytically active copper-based phases by impregnating these supports with salts. Dry impregnation is carried out. The drying and calcination conditions depend on the nature of the copper salt for impregnation and are indicated below:

copper sulphate: drying: 15 h at 120° C. calcination: 12 h at 350° C.

copper nitrate: drying: 15 h at 85° C. calcination: 3 h at 500° C.

For the beads 1 impregnated with 16 and 21% copper, the preparation process was modified. For this, two impregnations were made with copper nitrate, each employing half of the amount of desired copper and while complying with the following conditions:

1st impregnation: drying: 15 h at 85° C. calcination: 0.3 h at 750° C. for the deposition of 16% copper 0.3 h at 550° C. for the deposition of 21% copper 2nd impregnation: drying: 15 h at 85° C. calcination: 3 h at 500° C.

2. Deposition of the elements other than copper:

The salts used for the various metals are the following:

| | |
|---|---|
| copper: | sulphate or nitrate |
| iron: | sulphate or nitrate |
| cobalt: | sulphate or nitrate |
| nickel: | sulphate or nitrate |
| manganese: | acetate |
| calcium: | sulphate |
| molybdenum: | ammonium heptamolybdate |
| vanadium: | oxalate |
| ruthenium: | chloride |

For the beads which were impregnated both with copper and either with iron or with molybdenum or with cobalt or with nickel or with vanadium, the preparation process consists firstly in impregnating the beads with the salt of the element other than copper, and then in drying them at 85° C. for 15 h. They are then impregnated with copper nitrate, after which they are dried at 85° C. for 15 h and calcined at 500° C. for 3 h.

A different impregnation process was used to deposit copper and ruthenium: the beads were first impregnated with the copper salt and then dried at 85° C. for 15 h and calcined at 500° C. for 3 h. They were then impregnated with ruthenium chloride, after which they are dried at 85° C. for 15 h and calcined at 250° C. for 1 h.

Catalytic test

The catalytic test procedure proceeds in three steps.

The catalyst is first subjected to a pre-ageing operation so as to test it under normal conditions of use. This pre-ageing is a presulphatation at 140° C. by passing for 20 h an effluent whose average composition by volume is:

1.5% $H_2S$
2.4% $O_2$
30% $H_2O$
66.1 $N_2$

The catalyst is then subjected to regeneration at 300° C. by passing for 6 h an effluent whose average composition by volume is:

30% $H_2O$
70% $N_2$ and then passing for 8 h another effluent whose average composition by volume is:

2.6% $H_2S$
30% $H_2O$
67.4% $N_2$

Lastly, the direct oxidation reaction is carried out at 140° C. by passing an effluent comprising:

2500 ppm of $H_2S$
4000 ppm of $O_2$
30% $H_2O$
69.35% $N_2$.

During this last step, the conversion a of the $H_2S$ and the yield β of $SO_2$ are measured for a reaction time of 8 h and a contact time of 4 sec or 2 sec.

The results are collated in Tables 2 and 3.

TABLE 2

| Nature of the catalytic phase (nature of the impregnation salt) | % by weight of element relative to the catalyst | Contact time: 4 sec | | Contact time: 2 sec | |
|---|---|---|---|---|---|
| | | α: conversion of $H_2S$ | β: yield of $SO_2$ | α: conversion of $H_2S$ | β: yield of $SO_2$ |
| BEADS 1 (alumina) | | | | | |
| 4.1% Cu (sulphate) | 4.1% | 72 | 0 | 44 | 0 |
| 7.9% Cu (sulphate) | 7.9% | 100 | 0 | 53 | 0 |
| 7.9% Cu (nitrate) | 7.9% | 100 | 0 | 64 | 1 |
| 14.2% Cu (nitrate) | 14.2% | 95 | 3 | 65 | 3 |
| 16% Cu (nitrate) | 16% | 73 | 2 | 54 | 1 |
| 21% Cu (nitrate) | 21% | 100 | 0 | 81 | 3 |
| 7.6% Cu (nitrate) 2.4% Fe (nitrate) | 7.6% 2.4% | 100 | 2 | 97 | 6 |
| 7.3% Cu (nitrate) 4.8% Fe (nitrate) | 7.3% 4.8% | 100 | 0 | 96 | 10 |
| 10.6% Cu (nitrate) 0.9% Co (nitrate) | 10.6% 0.9% | 97 | 3 | 59 | 2 |
| 9.7% Cu (nitrate) 1.7% Co (nitrate) | 9.7% 1.7% | 100 | 0 | 79 | 3 |
| 9.7% Cu (nitrate) 2.6% Co (nitrate) | 9.7% 2.6% | 100 | 0 | 82 | 6 |
| 10.5% Cu (nitrate) 1.9% Ni (nitrate) | 10.5% 1.9% | 100 | 7 | 98 | 14 |
| 6.6% Cu (nitrate) 10.01% Mo | 6.6% 10.0% | 75 | 0 | 59 | 0 |
| 3.8% Co (sulphate)* | 3.8% | 99 | 39 | 98 | 15 |
| 3.5% Mn* | 3.5% | 34 | 3 | 31 | 4 |
| 1.9% Fe (sulphate)* | 1.9% | 93 | 23 | 69 | 16 |
| 6.9% Fe (sulphate)* | 6.9% | 97 | 65 | 83 | 24 |
| 3.8% Ni (sulphate)* | 3.8% | 97 | 18 | 94 | 22 |
| BEADS 2 (alumina) | | | | | |
| 4.1% Cu (nitrate) | 4.1% | 100 | 0 | 73 | 0 |
| BEADS 3 (alumina) | | | | | |
| 7.9% Cu (nitrate) | 7.9% | 86 | 0 | 39 | 0 |
| BEADS 4 (alumina) | | | | | |
| 11.9% Cu (nitrate) | 11.9% | 100 | 0 | 48 | 0 |

*comparative examples

TABLE 3

| Nature of the catalytic phase (nature of the impregnation salt) | Content of element relative to the catalyst | Contact time: 4 sec | | Contact time: 2 sec | |
|---|---|---|---|---|---|
| | | α: conversion of $H_2S$ | β: yield of $SO_2$ | α: conversion of $H_2S$ | β: yield of $SO_2$ |
| EXTRUDATES 1 (alumina) | | | | | |
| 7.9% Cu (nitrate) | 7.9% | 100 | 0 | 71 | 1 |
| 10.2% Cu (nitrate) 0.9% Co (nitrate) | 10.2% 0.9% | 10 | 2 | 79 | 4 |
| 10.2% Cu (nitrate) 0.8% V | 10.2% 0.8% | 93 | 5 | 76 | 3 |
| 10.1% Cu (nitrate) 1.4% Ru | 10.1% 1.4% | 100 | 2 | 78 | 2 |
| EXTRUDATES 2 (titanium dioxide) | | | | | |
| 7.9% Cu (sulphate) 4.1% Ca | 7.9% 4.1% | 99 | 1 | 71 | 0 |
| 1.8% Fe (sulphate)* 4.3% Ca* | 1.8% 4.3% | 100 | 33 | 100 | 31 |
| 4.4% Ca* | 4.4% | 49 | 0 | 46 | 0 |

*comparative examples

It is observed that all the copper-based catalysts make it possible to obtain a good total conversion of the $H_2S$ while at the same time minimizing the formation of $SO_2$.

In contrast, the catalysts of the prior art have either a good conversion of $H_2S$ but simultaneously a high yield of $SO_2$ (for instance those based on Co, Fe and Ni) or a low yield of $SO_2$ but a poor conversion of $H_2S$ (for instance those based on Mn).

We claim:

1. Process for the direct oxidation of sulphur compounds into elemental sulfur and/or into sulfates at a temperature below 200° C., comprising using a supported catalyst whose catalytically active phase comprises copper and at least one other catalytically active element chosen from the group consisting of iron, molybdenum, titanium, nickel, cobalt, tin, germanium, gallium, ruthenium, antimony, niobium, manganese, vanadium, magnesium, calcium and chromium, the copper element being present in a content of at least 2% by weight relative to the catalyst and of at least 15% by weight relative to the sum of the active elements of the catalytically active phase.

2. Process according to claim 1, wherein the copper content is at least 6% by weight relative to the catalyst.

3. Process according to claim 1, wherein the catalytically active phase is composed of copper and cobalt, the cobalt content being not more than 5% by weight relative to the catalyst and the copper content not more than 6% by weight relative to the catalyst.

4. Process according to claim 1, wherein characterized in that the copper element of the catalytically active phase is obtained from copper nitrate.

5. Process according to claim 1, wherein the catalyst support is based on titanium dioxide, zirconia, silica, alumina-silica or alumina.

6. Process according to claim 1, wherein the support is based on alumina, said alumina having a specific surface of at least 20 $m^2/g$ and a total pore volume of at least 0.3 $cm^3/g$.

7. A process for the direct oxidation of sulfur compounds into elemental sulfur and/or into sulfates at a temperature below 200° C., comprising using a supported catalyst whose support is selected from the group consisting of titanium dioxide, zirconia, silica, an alumina-silica and an alumina, and whose catalytically active phase contains a copper component and at least one other catalytically active component selected from the group consisting of iron, molybdenum, titanium, nickel, cobalt, tin, germanium, gallium, ruthenium, antimony, niobium, manganese, vanadium, magnesium, calcium and chromium compound, said copper component being present in a content of at least 2% by weight relative to the catalyst and of at least 15% by weight relative to the sum of the active components of the catalytically active phase.

* * * * *